(12) United States Patent
Simkulet

(10) Patent No.: US 7,331,548 B1
(45) Date of Patent: Feb. 19, 2008

(54) CONTROL LINKAGE FOR T-TAIL AIRCRAFT ELEVATOR SURFACES

(75) Inventor: Michael W. Simkulet, Andover, KS (US)

(73) Assignee: Hawker Beechcraft Corporation, Wichita, KS (US)

( * ) Notice: Subject to any disclaimer, the term of this patent is extended or adjusted under 35 U.S.C. 154(b) by 67 days.

(21) Appl. No.: 11/003,788

(22) Filed: Dec. 2, 2004

(51) Int. Cl.
*B64C 13/04* (2006.01)
*B64C 9/00* (2006.01)
*B64C 3/38* (2006.01)
*B64C 5/10* (2006.01)
*F16C 7/00* (2006.01)

(52) U.S. Cl. .................. 244/225; 244/220; 244/87; 244/90 R; 244/99.2; 74/579 R; 74/585; 74/580

(58) Field of Classification Search ........ 244/87–90 R, 244/99.2, 99.3, 213, 215, 225, 75.1, 224, 244/234, 237, 235, 220, 221, 131; 403/53, 403/74, 57, 58; 74/579 R–579 E, 580, 585, 74/99 R; 464/112, 70, 185, 904; 384/192, 384/558

See application file for complete search history.

(56) References Cited

U.S. PATENT DOCUMENTS

| | | | | |
|---|---|---|---|---|
| 1,907,374 A | * | 5/1933 | Van Atta | 244/87 |
| 1,973,064 A | * | 9/1934 | Gwinn, Jr. | 384/497 |
| 2,187,152 A | * | 1/1940 | Gwinn, Jr. | 244/225 |
| 2,240,258 A | * | 4/1941 | Gwinn, Jr. | 244/104 CS |
| 2,381,721 A | * | 8/1945 | Carroll | 244/221 |
| 2,471,283 A | * | 5/1949 | Parker | 244/225 |
| 2,496,931 A | * | 2/1950 | Brouse | 74/502 |
| 2,538,602 A | * | 1/1951 | Taylor et al. | 244/49 |
| 2,573,044 A | * | 10/1951 | Morris | 244/232 |
| 2,580,841 A | * | 1/1952 | Ross | 244/90 R |
| 2,613,891 A | * | 10/1952 | Knight | 244/87 |
| 2,685,422 A | * | 5/1954 | Hammond et al. | 244/225 |
| 2,809,794 A | * | 10/1957 | Swinehart et al. | 244/80 |
| 2,960,288 A | * | 11/1960 | Hartel | 244/102 R |
| 3,223,365 A | * | 12/1965 | Snook, Jr. | 244/90 R |
| 3,421,719 A | * | 1/1969 | Ask | 244/99.3 |
| 3,427,824 A | * | 2/1969 | Martin | 464/117 |
| 3,756,089 A | * | 9/1973 | Haladay | 74/96 |
| 3,771,924 A | * | 11/1973 | Buchstaller | 416/121 |
| 3,954,231 A | * | 5/1976 | Fraser | 244/225 |

(Continued)

OTHER PUBLICATIONS

Austin, "Double Cardon Joint CV Driveshaft: Building And Refitting", printed from the Internet on Nov. 18, 2004, http://www.d-90.com/tech/cv1.html, 5 pgs.

(Continued)

*Primary Examiner*—Teri Pham Luu
*Assistant Examiner*—Joshua Michener
(74) *Attorney, Agent, or Firm*—O'Keefe, Egan, Peterman & Enders LLP

(57) ABSTRACT

Systems and methods for implementing control linkages that may be employed to produce synchronous motion in two adjacent controlled devices controlled by a common input. In one example implementation, a semi-rigid modified constant velocity (CV) joint control linkage may be provided that is laterally self-stabilizing. The modified constant velocity CV joint control linkage may include an input push rod assembly that is self-aligning, deflectable and of an adjustable length. The CV joint may be configured with a central cage that is allowed to skew to allow for alignment of the controlled devices.

27 Claims, 9 Drawing Sheets

U.S. PATENT DOCUMENTS

| | | | | |
|---|---|---|---|---|
| 4,048,004 A | * | 9/1977 | Watkins | 156/580.1 |
| 4,172,575 A | * | 10/1979 | Cole | 244/216 |
| 4,243,192 A | * | 1/1981 | Johnson | 244/215 |
| 4,243,339 A | * | 1/1981 | Dickerson | 403/4 |
| 4,431,149 A | * | 2/1984 | Brislawn et al. | 244/99.14 |
| 4,470,569 A | * | 9/1984 | Shaffer et al. | 244/214 |
| 4,482,115 A | * | 11/1984 | Lassiter, Jr. | 244/220 |
| 4,494,716 A | * | 1/1985 | Breedveld et al. | 244/213 |
| 4,526,058 A | * | 7/1985 | Runkel et al. | 74/531 |
| 4,553,768 A | * | 11/1985 | Furukawa et al. | 280/124.134 |
| 4,610,461 A | * | 9/1986 | Guzzetta | 280/124.134 |
| 4,611,681 A | * | 9/1986 | Krude et al. | 180/359 |
| 4,632,203 A | * | 12/1986 | Krude | 180/359 |
| 4,778,129 A | * | 10/1988 | Byford | 244/49 |
| 4,871,130 A | * | 10/1989 | Schulze | 244/55 |
| 5,577,758 A | * | 11/1996 | Csik | 280/124.134 |
| 5,653,146 A | * | 8/1997 | Barton | 74/492 |
| 5,823,471 A | * | 10/1998 | Dazet | 244/99.3 |
| 5,950,489 A | * | 9/1999 | McKenzie | 74/110 |
| 6,062,982 A | * | 5/2000 | Cartwright | 464/113 |
| 6,247,196 B1 | * | 6/2001 | Jurmu | 180/24.01 |
| 6,270,039 B1 | * | 8/2001 | Linjama | 244/213 |
| 6,287,207 B1 | * | 9/2001 | Rui et al. | 464/162 |
| 6,347,770 B1 | * | 2/2002 | Oyzerskiy et al. | 244/234 |
| 6,390,485 B1 | * | 5/2002 | Cadden | 280/124.163 |
| 6,691,844 B2 | * | 2/2004 | Schott | 192/22 |
| 6,755,376 B1 | * | 6/2004 | Broberg | 244/99.2 |
| 7,037,202 B2 | * | 5/2006 | Bigelow et al. | 464/50 |
| 2003/0004002 A1 | * | 1/2003 | Cornay et al. | 464/114 |

OTHER PUBLICATIONS

Austin, "Double Cardon Joint CV Driveshaft: Building And Refitting", printed from the Internet on Nov. 18, 2004, http://www.d-90.com/tech/cv2.html, 7 pgs.

Austin, "Double Cardon Joint CV Driveshaft: Building And Refitting", printed from the Internet on Nov. 18, 2004, http://www.d-90.com/tech/cv3.html, 5 pgs.

* cited by examiner

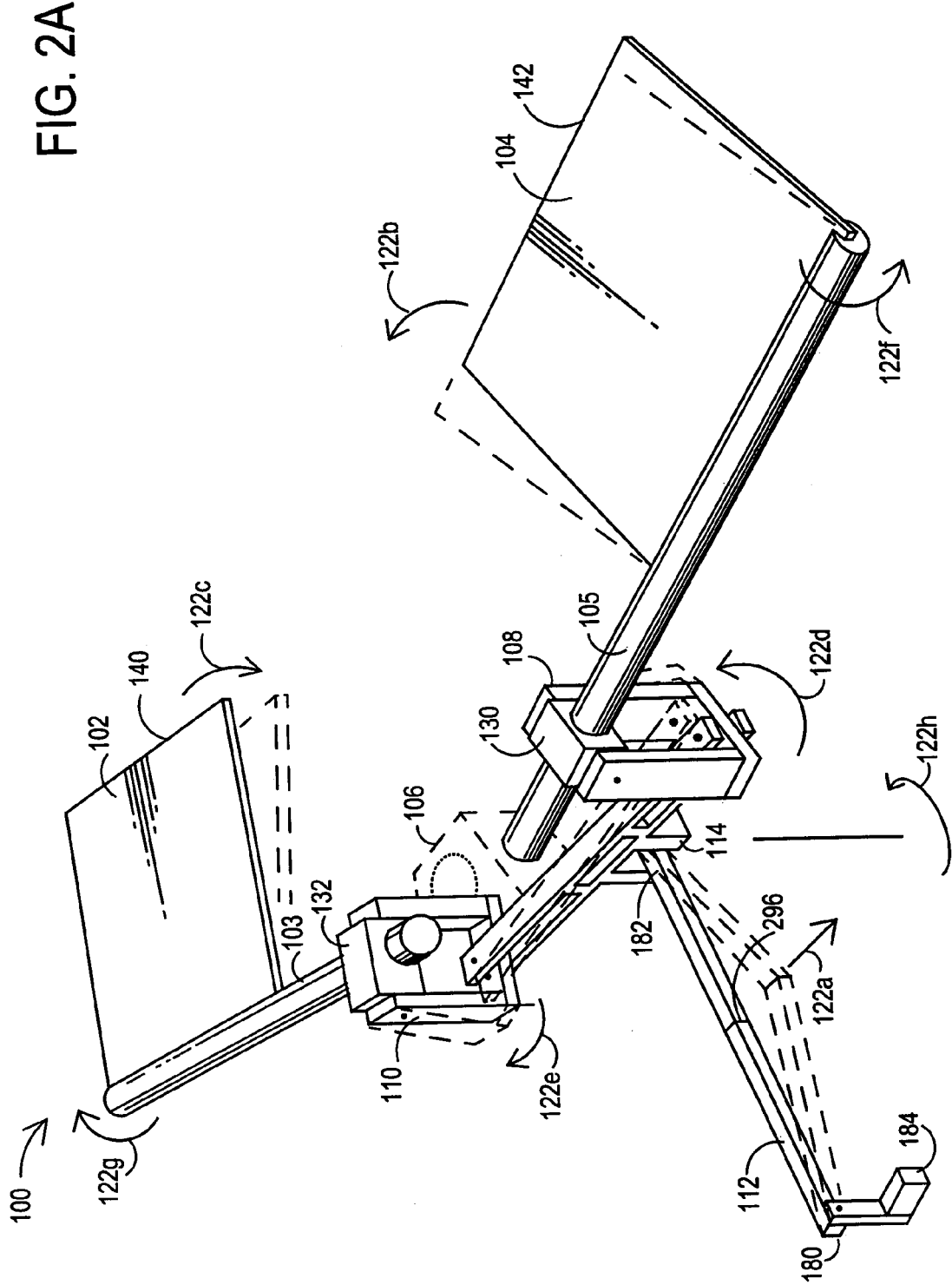

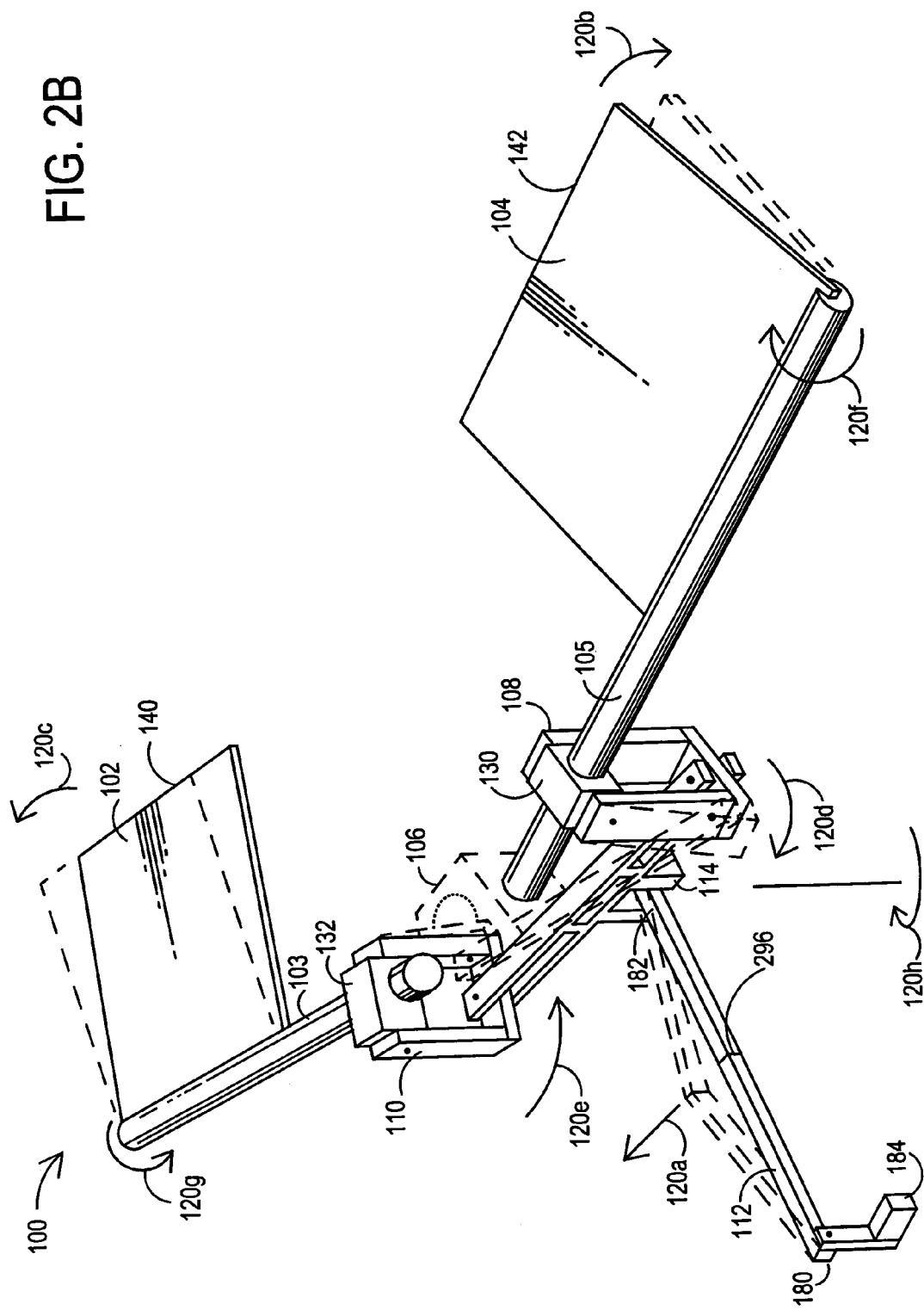

CONTROL LINKAGE FOR T-TAIL
AIRCRAFT ELEVATOR SURFACES

BACKGROUND OF THE INVENTION

1. Field of the Invention

This invention relates generally to control linkages, and more particularly to control linkages configured to produce synchronous motion in adjacent controllable devices.

2. Background

Conjoined flight control surfaces are often employed on aircraft. One example of conjoined flight control surfaces are dual swept elevator surfaces found at the top of the vertical stabilizer of many "T-tail" aircraft. These dual elevator surfaces are hinged control surfaces adjacently mounted at the trailing edge of the horizontal stabilizer, and act in unison to provide control of the aircraft about the pitch axis. In many T-tail aircraft, dual swept elevator surfaces are actuated by control horns that take the form of swing arms individually connected to adjustable threaded rod ends of a common (bifurcated) pitch control link. During flight maneuvers, torsional forces tend to cause a rocking motion (aeroelastic) of the horizontal stabilizer relative to the vertical stabilizer. This rocking motion tends to induce torque on the bi-furcated pitch control link. This torque will impart a lateral deflection into the control horns and produce differential elevator motion, which can result in a aerodynamically unstable condition, i.e., causing buzz or flutter of the control surfaces.

In many T-tail aircraft, the elevator control horns and bifurcated pitch control link are laterally stabilized by a torque knee linkage attached to the fixed vertical stabilizer in order to address the instability that can result from the twisting rocking motion of the horizontal stabilizer relative to the vertical stabilizer. In such aircraft, the bifurcated pitch control link is nominally stabilized by a forward hinge attachment to a rigidly mounted control lever. Lateral spacing of the individual rod ends provides enough moment couple to allow differential elevator travel and a resultant lateral swing in the pitch control link. The torque knee linkage is attached to the elevator pitch control link to restrain the observed lateral looseness.

Use of the torque knee stabilizing linkage addresses the looseness of the elevator control linkage path in non-flying "static" condition. However, in flight the aeroelastic motion exists between the horizontal and vertical stabilizers tends to induce additional loads and in turn creates a source of wear in the stabilizing system. Experience has shown that wear is induced by the aeroelastic dynamics in the torque knee linkage results in elevator trailing edge freeplay and lateral motion in the control linkages. This wear often necessitates replacement of the torque knee linkage, and requires that a routine maintenance program be implemented to monitor the condition of the torque knee linkage.

SUMMARY OF THE INVENTION

Disclosed herein are systems and methods for implementing control linkages that may be employed to produce synchronous motion (e.g., synchronous rotation) in two adjacent devices (e.g., control surfaces) controlled by a common input. In one embodiment, the disclosed control linkages may be advantageously implemented with any apparatus or device having two adjacent controllable devices that need individual alignment but share a single control input. Example implementations include, but are not limited to, aircraft control surfaces such as adjacent elevator panels, adjacent flap panels, adjacent slats, adjacent spoilers, adjacent airbrakes, etc. Other example implementations include, but are not limited to, boat or ship control surfaces (e.g., adjacent trim vanes), active automotive suspension and steering systems (e.g., body roll induced and/or bounce induced tire camber changes), surface ship stabilizer surfaces, submarine control surfaces, etc. Advantageously, the disclosed control linkages may be installed as original equipment of a control system, or may be retrofitted to an existing control system by replacing one or more components of the original system with components of the disclosed control linkages.

In one embodiment, disclosed is control linkage that employs a semi-rigid modified constant velocity (CV) joint and push rod linkage to replace the elevator control horns, input control link (e.g., bi-furcated pitch control link) and torque knee components that are traditionally employed to actuate dual swept elevator surfaces of T-tail aircraft. The modified CV joint linkage mechanism may be installed as original equipment on a new aircraft, or may be retrofitted to a previously installed elevator system of an existing aircraft. In either case, the lateral rigidity of the modified CV joint may be used to substantially eliminate the need for a torque knee auxiliary linkage to the vertical stabilizer structure, and to lock the two surface hinge lines together using the CV joint to transmit rotational motion between skewed shafts. Advantageously, the disclosed control linkage is laterally self-stabilizing and may be implemented to substantially eliminate the aeroelastic motion feedback path and loads experienced with traditional configurations.

The disclosed modified CV joint linkage mechanism may also be implemented to address alignment and/or rigging requirements for two adjacent control surfaces that need individual alignment but share a single control input for common deployment, and may be implemented in one embodiment to provide adjustability that advantageously reduces the rigging requirements for aligning adjacent devices (e.g., tail surfaces of a T-tail aircraft) and other components. For example, in the case of adjacent elevator surfaces of a T-tail aircraft, elevator control and individual trailing edge rigging capabilities may be combined. In this regard, the CV joint of the control linkage may be configured so that the midplane of the central cage of the CV joint is allowed to be skewed relative to the nominal CV joint centerline (e.g., a line connecting the center-points of two universal joints of the CV joint) for surface trailing edge alignment through differential motion, and to allow joint compensation for manufacturing variation of the airframe and linkage components without shimming. For example, in one embodiment, the central cage of the CV joint may be capable of maximum skew of plus or minus about 2.5 degrees to the nominal rotational axis. For example, the disclosed control linkage may be provided with a push rod linkage that is provided with an optional push rod deflection mechanism in the form of an adjustable eccentric circular cam contained within an elongated opening or slotted cavity in the aft portion of the rod. The adjustable eccentric cam may be employed to deflect the push rod about a rod deflection pivot point to rig the surface trailing edges. With this exemplary configuration, the mechanism may be used to skew the central cage of the CV joint and to rack the surface hinge lines with differential motion. When the surface trailing edges align, the cam may be configured to be locked in position to hold the rod deflection and the skewed cage position.

The disclosed modified CV joint configuration disclosed herein advantageously combines the ability of a conventional CV joint to faithfully transmit rotational motion (synchronous motion) with an adjustability that allows for phase shifting of the adjacent hinge line shafts and synchronization of adjacent controllable devices (e.g., two adjacent elevator surface trailing edges) so as to provide a differential motion rigging capability. Additionally, the combination of one rigid yoke axle and one semi-rigid self-aligning yoke axle may be used to allow the modified joint installation to accommodate manufacturing variation of the rotating shaft locations (e.g., hinge line shaft locations) and angular variation of the universal joint (yoke) axles, e.g., to allow a standardized modified CV joint linkage mechanism to be provided and used for retrofitting different aircraft without requiring customization, shimming, etc. The combination of a modified CV joint and a deflectable push rod allows for substantially full adjustability or rigging of two adjacent control surfaces (e.g., two adjacent elevator surface trailing edges) with a single common input link while also compensating for a variety of manufacturing and installation variables, while at the same time requiring no shims. When implemented as a control linkage for dual adjacent elevator surfaces, the disclosed CV joint installation provides for synchronous rigging to match the cockpit controls and isolates the control system linkage from aeroelastic deflections and loads.

In one respect, disclosed herein is a control assembly for controlling two adjacent controllable devices, including: a first rotational joint configured for coupling to a first one of the controllable devices; a second rotational joint configured for coupling to a second one of the controllable devices; and a cross-connection coupled between the first and second rotational joints.

In another respect, disclosed herein is a control linkage mechanism for producing synchronous motion in two adjacent elevator surfaces of a T-tail aircraft, including: a rigid universal joint yoke assembly configured for coupling to control a first one of the adjacent elevator surfaces; a semi-rigid universal joint yoke assembly configured for coupling to control a second one of the adjacent elevator surfaces; a central cage coupled between the rigid universal joint yoke assembly and the semi-rigid universal joint yoke assembly; and an input push rod assembly having a first end coupled to the central cage and a self aligning second end configured for coupling to a control input device.

In another respect, disclosed herein is a dual elevator system for an aircraft having a vertical stabilizer and a horizontal stabilizer attached to the vertical stabilizer, the dual elevator system including: a first elevator assembly, the first elevator assembly having a first elevator surface and a first elevator hinge, the first elevator hinge being rotatably attached to the horizontal stabilizer of the aircraft; a second elevator assembly, the second elevator assembly having a second elevator surface and a second elevator hinge, the second elevator hinge being rotatably attached to the horizontal stabilizer of the aircraft; and a modified CV joint control linkage mechanism. The modified CV joint control linkage mechanism may include: a rigid universal joint yoke assembly having a yoke axle coupled to the first elevator hinge, a semi-rigid universal yoke assembly having a yoke axle coupled to the second elevator hinge, a central cage coupled between the rigid universal joint yoke assembly and the semi-rigid universal joint yoke assembly, the central cage being coupled at a first end to the rigid universal joint yoke assembly with a rigid hinge axle and being coupled at second end to the rigid universal joint yoke assembly with a semi-rigid hinge axle, and an input push rod assembly having a first end coupled to the central cage and a self-aligning second end coupled to a control lever, the control lever being fixedly attached to the vertical stabilizer of the aircraft.

In another respect, disclosed herein is a control assembly for producing synchronous motion in two adjacent controllable devices, including: a first yoke means for rotatably coupling to a first one of the controllable devices; a second yoke means for rotatably coupling to a second one of the controllable devices; and a yoke connection means for rotatably coupling each of the first and second yoke means together in laterally spaced relationship.

In another respect, disclosed herein is a method for inducing synchronous motion of two adjacent controllable devices, including: providing a first rotational joint coupled to a first one of the controllable devices, and a second rotational joint coupled to a second one of the controllable devices, the first and second rotational joints being coupled together by a cross-connection; and inducing the synchronous motion in the first and second controllable devices in response to a single input control motion received in the cross connection; wherein the synchronous motion is induced by providing control motion to the first controllable device through the first rotational joint, and providing control motion to the second controllable device to the second controllable device through the second rotational joint.

In another respect, disclosed herein is a method of installing a modified CV joint control linkage mechanism in an existing dual elevator system of an aircraft having a vertical stabilizer and a horizontal stabilizer attached to the vertical stabilizer, the method including: providing a modified CV joint control linkage mechanism that includes a rigid universal joint yoke assembly, a semi-rigid universal yoke assembly, a central cage coupled between the rigid universal joint yoke assembly and the semi-rigid universal joint yoke assembly, the central cage being coupled at a first end to the rigid universal joint yoke assembly with a rigid hinge axle and being coupled at second end to the rigid universal joint yoke assembly with a semi-rigid hinge axle, and an input push rod assembly having a first end coupled to the central cage and a self-aligning second end. The method may include the steps of: attaching the rigid universal joint yoke assembly to a first elevator hinge of a first elevator assembly of the elevator system, the first elevator hinge being rotatably attached to the horizontal stabilizer of the aircraft; attaching the semi-rigid universal yoke assembly to a second elevator hinge of a second elevator assembly of the elevator system, the second elevator hinge being rotatably attached to the horizontal stabilizer of the aircraft; and attaching the self-aligning second end of the input push rod to a control lever of the elevator assembly.

BRIEF DESCRIPTION OF THE DRAWINGS

FIG. 2A is a simplified oblique view of a dual elevator system according to one exemplary embodiment of the disclosed systems and methods.

FIG. 2B is a simplified oblique view of a dual elevator system according to one exemplary embodiment of the disclosed systems and methods.

DESCRIPTION OF ILLUSTRATIVE EMBODIMENTS

Figure 1:
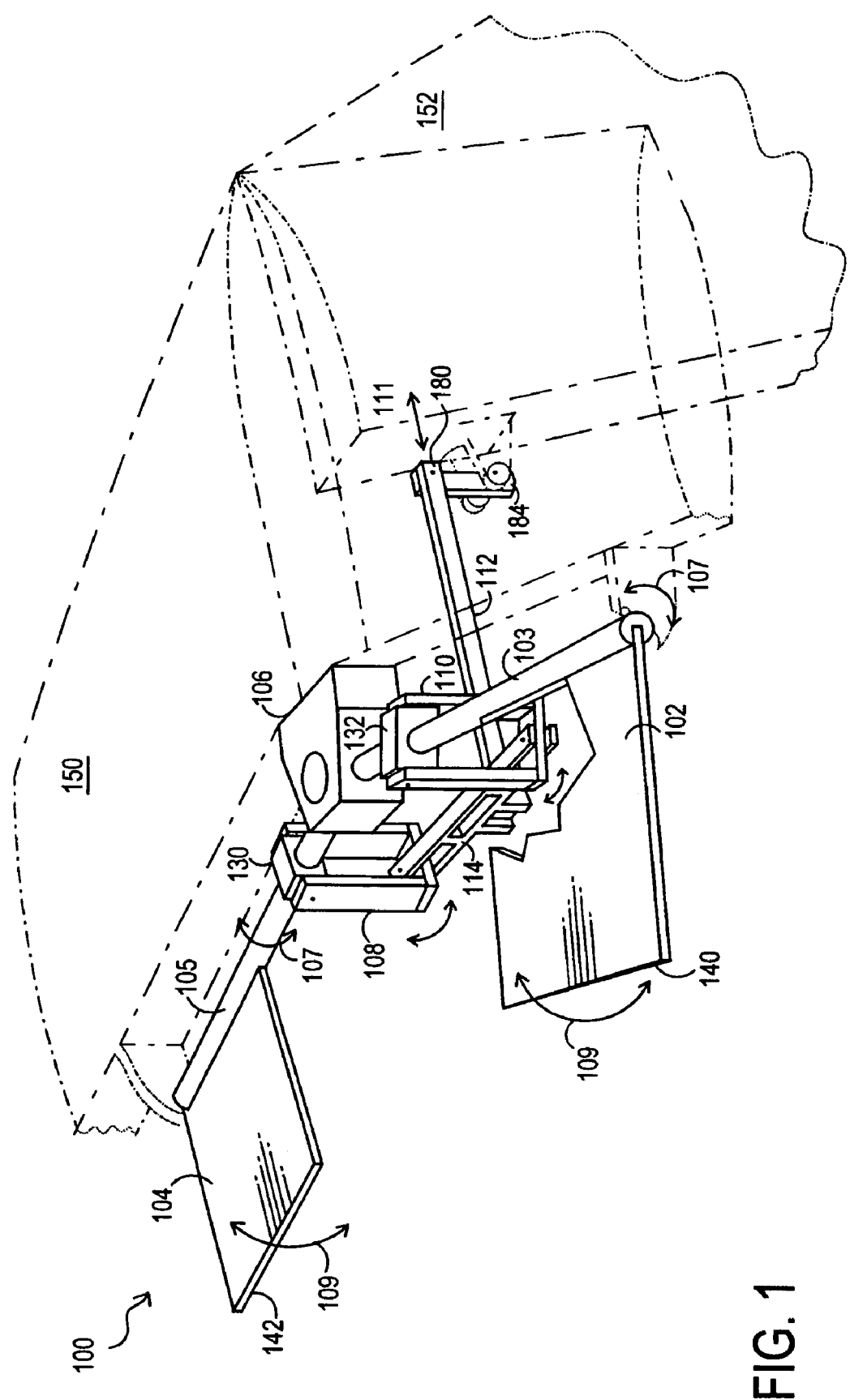
FIG. 1 is a simplified oblique view of a dual elevator system according to one exemplary embodiment of the disclosed systems and methods.

FIG. 1 is a simplified oblique view of a dual elevator system 100 that includes dual swept elevator surfaces 102 and 104 that are mechanically coupled by elevator hinges 103 and 105 to components of a control linkage that is configured according to one exemplary embodiment of the disclosed systems and methods. In this embodiment, dual elevator system 100 is shown as an elevator system configured for use in the tail assembly of a T-tail aircraft (e.g., Beech Model 400, Beech Model 390, etc.). However, as described elsewhere herein, the control linkages of the disclosed systems and methods may be configured for use in other implementations.

Still referring to FIG. 1, components of the control linkage of the illustrated exemplary embodiment include a deflectable input push rod assembly 112 that is mechanically coupled to rigid universal joint yoke assembly 110 and semi-rigid universal joint yoke assembly 108 by constant velocity (CV) joint cage 114. Rigid universal joint yoke assembly 110 has a rotating axis that acts as a pure hinge and lateral anchor to CV joint cage 114 and that maintains a fixed distance from hinge line 103. Semi-rigid universal joint yoke assembly 108 is anchored to CV joint cage 114 by a rotating axis that has self-aligning capacity relative to CV joint cage 114 and that maintains a fixed distance from hinge line 105.

Elevator hinges 103 and 105 are rotatably anchored to elevator hinge fitting 106 in a manner that allows hinges 103 and 105 to hinge or rotate about their respective axes in the direction of arrows 107 so as to impart up and down motion to trailing edges of elevator surfaces 102 and 104 in the direction of arrows 109. Elevator hinge fitting 106 is rigidly attached to a stationary component of the tail assembly (e.g., horizontal stabilizer 150). Cross bolt connections 130 and 132 are provided to couple elevator hinges 103 and 105 to rigid yoke assembly 110 and semi-rigid yoke assembly 108, respectively. Rigid yoke assembly 110, semi-rigid yoke assembly 108 and CV joint cage 114 together define a CV joint assembly.

In the exemplary embodiment of FIG. 1, the CV joint assembly (i.e., formed by rigid yoke assembly 110, semi-rigid yoke assembly 108 and CV joint cage 114) is laterally anchored by cross bolt connection 132 between elevator hinge 103 and rigid yoke assembly 110. In this embodiment, the lateral rigidity of the CV joint assembly advantageously eliminates the need for a torque knee auxiliary linkage to the vertical stabilizer structure 152. At the same time, the CV joint assembly acts to lock together the two elevator hinge lines by virtue of the ability of the CV joint assembly to transmit rotational motion between skewed shafts for synchronous surface deflection control. It will be understood that a CV joint assembly may be configured in any other suitable manner to achieve the self-aligning benefits of the disclosed systems and methods. In this regard, the disclosed CV joint assembly may be implemented with self-aligning capability using a CV cage and a combination of a rigid or non-self-aligning joint with a semi-rigid or self aligning joint.

Referring now to FIGS. 2A and 2B, the CV joint assembly may be further configured to allow central cage 114 to skew from the nominal position to allow for surface trailing edge alignment of elevator surfaces 102 and 104, and to give the added benefit of allowing the CV joint assembly to be used to compensate for manufacturing variation of the airframe and linkage components without any shimming. In this regard, skew of central cage 114 may be accomplished using any suitable methodology and/or configuration. As shown for the illustrated embodiment, the CV joint central cage 114 may be skewed at the cage hinge connection to the aft end of the input push rod assembly 112, and input push rod assembly 112 may be configured to be deflectable in opposing directions perpendicular to the longitudinal axis of push rod assembly 112 about rod deflection pivot point 296 as indicated in dashed outline and by opposing arrows 120a and 122a. In FIGS. 2A and 2B, a portion of elevator hinge fitting 106 has been hidden to allow cage 114 and rigid yoke assembly 110 to be seen.

As shown in FIGS. 2A and 2B, deflection or displacement of the body of push rod assembly 112 in the directions of arrows 120a and 122a causes cage 114 to skew and translates to movement of trailing edges 142 and 140 of respective elevator surfaces 104 and 102 in opposite directions as indicated by arrows 120b, 120c, 122b and 122c (i.e., displacement or deflection of the body of push rod assembly 112 in the direction of arrow 120a results in movement of trailing edges of elevator surfaces 104 and 102 in the directions of arrows 120b and 120c respectively, and deflection of the body of push rod assembly 112 in the direction of arrow 122a results in movement of trailing edges of elevator surfaces 104 and 102 in the directions of arrows 122b and 122c respectively). Arrows 120f and 122f show movement of elevator hinge 105 about its respective axis, and arrows 120g and 122g show corresponding movement of elevator hinge 103 about its respective axis.

Still referring to FIGS. 2A and 2B, arrow 120d shows movement of semi-rigid yoke assembly 108 in response to deflection of the body of push rod assembly 112 in the direction of arrow 120a, and arrow 122d shows movement of semi-rigid yoke assembly 108 in response to deflection of the body of push rod assembly 112 in the direction of arrow 122a. Arrow 120e shows movement of rigid yoke assembly 110 in response to deflection of the body of push rod assembly 112 in the direction of arrow 120a, and arrow 122e shows movement of rigid yoke assembly 110 in response to deflection of the body of push rod assembly 112 in the direction of arrow 122a. Arrows 120h and 122h show skew movement of cage 114 corresponding to respective displacement or deflection of the body of push rod assembly 112 in the direction of respective arrows 120a and 122a.

During the adjustment of the push rod assembly, the rigid yoke assembly 110 and the semi-rigid yoke assembly 108 provide support for the ends of the central cage 114. Simultaneously the yokes 108 & 110 are rotating in opposite directions (differentially) with their associated surface hinge 105 & 103 respectively. The rigid yoke assembly 110 will tilt and stabilize the central cage 114 via the rigid bearing axle. The resulting misalignment of the central cage 114 with the semi-rigid yoke 108 is allowed by the self-aligning capabilities of the roller bearing within the semi-rigid yoke 108. The capacity of the of the semi-rigid yoke 108 to compensate for misalignment gives this linkage the added capacity to compensate for the manufacturing and assembly tolerances of these conjoined surfaces and components without resorting to shimming or custom fitting upon installation.

In the illustrated embodiment of FIGS. 1 and 2A and 2B, rigid universal joint yoke assembly 110 located at one end of the CV joint assembly substantially eliminates lateral looseness of the control linkage, and therefore eliminates the need for a torque knee linkage for stabilization. Furthermore, input control rod assembly 112 may be provided with a self-aligning capability that substantially eliminates the aeroelastic torsional loading from the stabilizer structure hinge lines to the control system components (e.g., yokes, cage and push rod assembly) and therefore acts to improve durability of the control linkage.

Deflection of the body of input push rod assembly 112 of FIGS. 1 and 2A and 2B may be accomplished using any suitable configuration and/or methodology, and any given portion or portions of the body of input push rod assembly 112 may be deflected that causes cage 114 to skew. For example, as described and illustrated further herein with respect to FIGS. 3-10, input push rod assembly 112 may be used to rig the elevator surface trailing edges 140 and 142 by using an adjustable and lockable eccentric cam shaft 720 that may be contained within the aft portion 182 of the rod to deflect the input push rod assembly 112 and skew the cage 114 so as to rack the surface hinge lines with differential motion. When the surface trailing edges 140 and 142 align, input push rod assembly 112 may be locked in deflected position by locking eccentric cam shaft 720 in position to hold the skewed position of cage 114. Further, the forward end 180 of input push rod assembly 112 may be configured to be adjustable in length and to have a self-aligning capability (e.g., by virtue spherical roller bearing rod end and a turnbuckle length adjustment) that breaks the torsional deflection load path of the current control linkage between the vertical stabilizer and horizontal stabilizer through the pitch control lever 184 to the elevator mounted control horns (not shown). Advantageously, this torsional load path disconnect may be provided to eliminate aggravating control input from the aeroelastic dynamic motions while still providing a substantially completely stabilized elevator control linkage.

Figure 3:
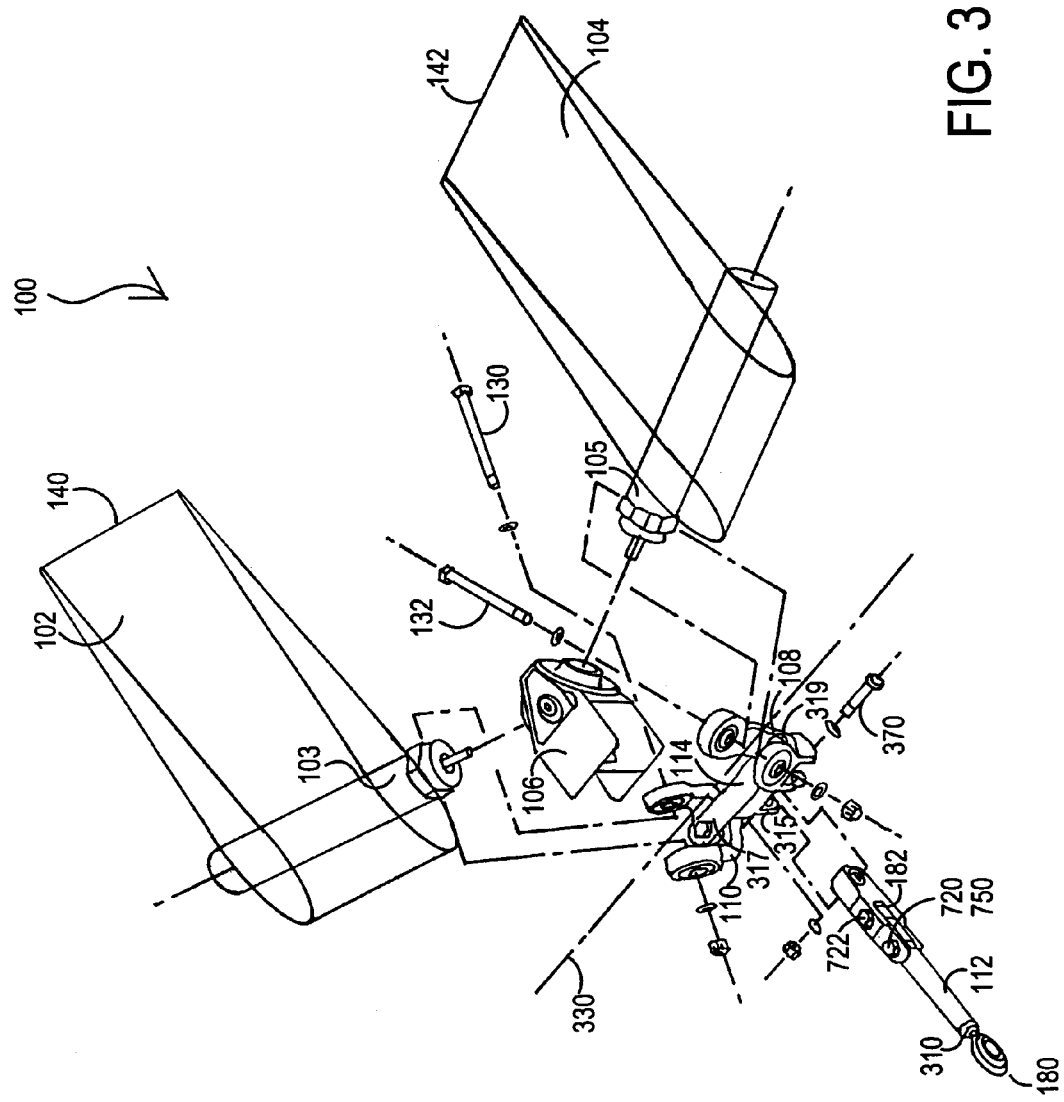
FIG. 3 is an exploded oblique view of a dual elevator system according to one exemplary embodiment of the disclosed systems and methods.

As described above, the ability to skew or move the axis of the CV joint cage 114 from being parallel to the joint axis may be used for purposes of control surface trailing edge alignment. Deflecting and locking the aft end of the pitch control push rod (e.g., in one embodiment by up to about ±2.5 degrees from a "normal" non-deflected or straight configuration) may be used to skew or rotate the cage 114 through the hinge connection axle 370 of FIG. 3 relative to the nominal CV joint centerline (shown as line 330 of FIG. 3). This bent configuration allows for alignment of the elevator trailing edges 140 and 142. As illustrated in FIG. 3, the forward end 180 of the input control push rod assembly 112 may be configured with a self-aligning length adjustment mechanism in the form of turnbuckle assembly 310 and threaded self-aligning rod end bearing 712 (shown in FIG. 7) that allows for push rod length adjustment and synchronous rigging of both elevator surfaces 102 and 104.

FIGS. 3 through 10 illustrate in greater detail components of a dual elevator system 100 that includes a control linkage that is configured with a modified CV joint control linkage mechanism according to one exemplary embodiment of the disclosed systems and methods. In the illustrated embodiment, the modified CV joint linkage mechanism includes four mechanical elements working in conjunction to transform a command input into synchronous rotation of two control surface hinge lines (i.e., of elevator hinges 103 and 105). These four mechanical elements include two bearing yoke assemblies 110 and 108, a central cage 114 with an integral input clevis 315, and a command input push rod assembly 112. As illustrated, the two "U" shaped bearing yoke assemblies 110 and 108 are each attached at a right angle to respective control surface hinge lines of elevator hinges 103 and 105 by cross-bolts 130 and 132 extending through openings provided in the uprights of the respective "U" shaped yoke assembly 110 or 108 to secure the control surface hinge line torque tube structure 103 or 105 between the uprights. In this manner, each attachment cross-bolt 130 and 132 serves as an axle of a universal joint mechanism. The second axle of each universal joint is established by bearings located in openings of the cross member of the "U" shape of each yoke assembly 110 and 108. As shown, a centerline 330 of the CV joint assembly (i.e., formed by rigid yoke assembly 110, semi-rigid yoke assembly 108 and CV joint cage 114) is defined by a line extending between the mid-point of the crossbolt axle of yoke assembly 110 and the mid-point of the crossbolt axle of yoke assembly 108.

As described further below for this exemplary embodiment, the central bearing of rigid yoke assembly 110 is a doubled bearing pack (406 & 408) that acts to produce a rigid axle that is coplanar with, and at a right angle to, the cross-bolt axle 130 and the control surface hinge line 103. In this exemplary embodiment, the central bearing of semi-rigid yoke assembly 108 is a self-aligning roller bearing 508 that is oriented in "U" of the yoke assembly 108 in the same manner as the central bearing 406/408 of rigid yoke assembly 110, and gives semi-rigid yoke assembly 108 a self-aligning capacity. However, it will be understood that a semi-rigid yoke assembly may be configured with any other suitable type of self-aligning bearing or feature in the practice of the disclosed systems and methods, e.g., self aligning spherical bearing, etc.

Still referring to the exemplary embodiment of FIGS. 3-10, central cage 114 is a solid "T" shaped component with devises 317 and 319 at the extremes of the cross member and clevis 315 at the upright leg. The width between the axles of cross member devises 317 and 319 is the same as the nominal distance between the mid-points of the installed yokes 110 and 108. Clevis 315 of the upright member of the "T" is coplanar with the other clevis axles and serves as a hinge axis for the aft end 182 of input push rod assembly 112. Input push rod assembly 112 is articulated laterally in the aft portion and adjustable in length with a threaded self-aligning roller rod end bearing and turnbuckle assembly 310 at forward end 180. The articulated aft rod end 182 is configured with a doubled bearing pack that forms rigid hinge axle 704 that mates with the middle clevis 315 of central cage 114. The forward self-aligning roller rod end

180 may be attached to a clevis of a control input device such as an existing control lever (not shown in FIG. 3).

By cantilevering cage 114 to one side of the joint axis and using one self-aligning bearing 508 and one rigid bearing pack 406 to join cage 114 to the universal joint yoke assemblies 108 and 110 introduces two degrees of freedom within the CV joint linkage mechanism. These two degrees of freedom are a 1) lateral freedom and 2) fore and aft rocking freedom from the "normal" resting position of the CV joint geometry. These added freedoms of motion compensate for the shaft hinge line positional tolerance and allows cage 114 to misalign from the normal position parallel to the joint axis. This freedom to misalign cage 114 may be implemented to give the desired ability to shift the relationship of shafts of elevator hinges 103 and 105 by differential rotation. In the embodiment of FIGS. 3-10, alignment of cage 114 may be controlled by a rigid hinge axle connection 704 to the aft end 182 of the command input push rod. Push rod assembly 112 may be bent at a pivot axle (e.g., eccentric cam shaft 720) located in the aft portion of the push rod assembly. The deflection angle of push rod assembly 112 acts to twist cage 114 by substantially the same angle around the rigid control yoke universal joint axle (e.g., rigid bearing pack 406/408). The twist of cage 114 is accommodated by tilt within the self-aligning bearing 508 of semi-rigid control yoke 108 and acts to produce differential rotation of the surface hinge lines of elevator hinges 103 and 105. The resulting differential rotation of the control surfaces 102 and 103 allows alignment of the surface trailing edges 140 and 142. The lateral stability of the disclosed modified CV joint linkage mechanism substantially eliminates the adverse deflections and loads of aeroelastic motion within the control system components and therefore enhances the system durability.

Figure 4:
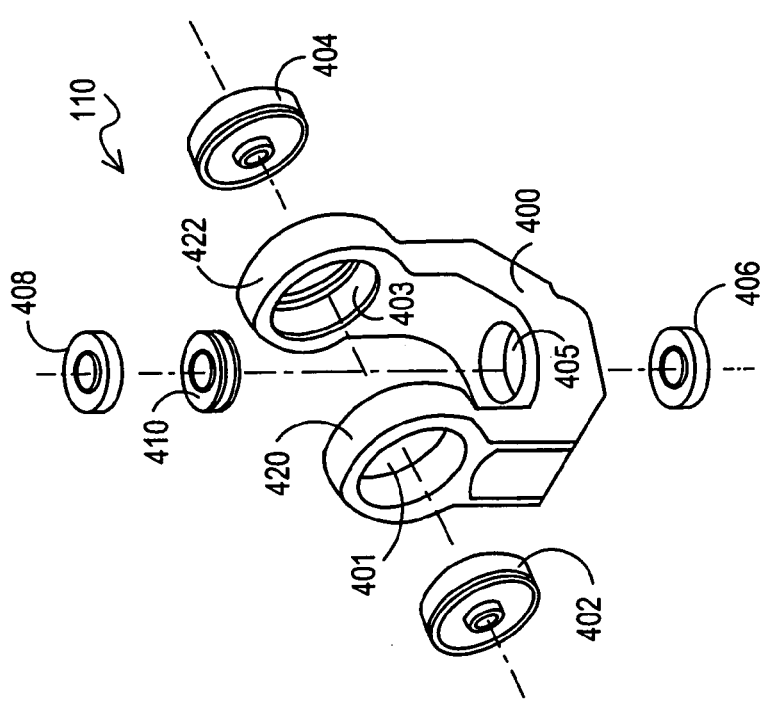
FIG. 4 is an exploded oblique view of a rigid yoke assembly according to one exemplary embodiment of the disclosed systems and methods.

As shown in FIG. 4, rigid yoke assembly 110 includes a "U" shaped yoke body 400 with yoke axles formed by rigid pair of cross-bolt bearings 402 and 404 (that are received in yoke openings 401 and 403 defined in yoke uprights 420 and 422) that are configured for receiving cross bolt 132 of dual elevator system 100. Rigid yoke assembly 110 also includes a spaced pair of cage hinge bearings 406 and 408 received in yoke opening 405 to form a bearing pack axle. As shown, spaced pair of hinge bearings 406 and 408 are separated by bearing spacer 410. This bearing pack axle acts as a hinge axle for central cage 114 and transfers the control input forces from cage 114 to the upper cross-bolt bearing pair 402 and 404. The yoke axles formed by cage hinge bearings 406 and 408 provide CV joint position restraint through the hinge line attachment to structure. Although one exemplary embodiment of a rigid rotational joint in the form of rigid yoke assembly 110 is described above, it will be understood that any other rigid rotational joint configuration may be employed that is suitable for providing rotation in a single plane relative to cage 114 or other cross connection device, e.g., lateral rotational motion relative to cage 114 or other cross connection device.

Figure 5:
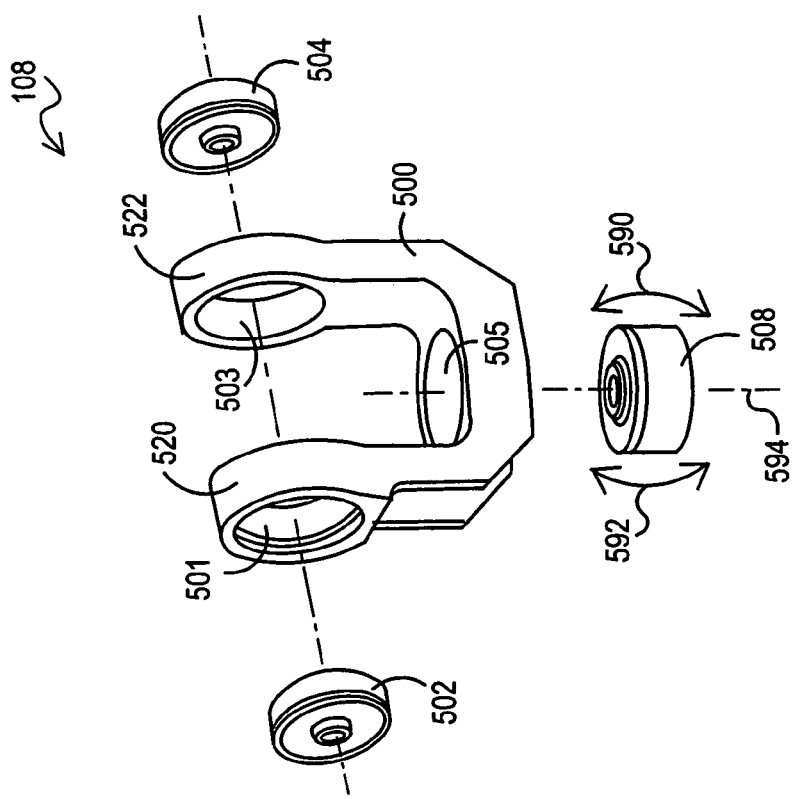
FIG. 5 is an exploded oblique view of a semi-rigid yoke assembly according to one exemplary embodiment of the disclosed systems and methods.

As shown in FIG. 5, semi-rigid yoke assembly 108 includes a "U" shaped yoke body 500 with yoke axles formed by rigid pair of cross-bolt bearings 502 and 504 (that are received in yoke openings 501 and 503 defined in yoke uprights 520 and 522) that are configured for receiving cross bolt 130 of dual elevator system 100. Semi-rigid yoke assembly 108 also includes a self-aligning roller bearing 508 received in yoke opening 505. In one exemplary embodiment, self-aligning roller bearing 508 may be received in yoke opening 505 and configured with the capability of tilting or pivoting (i.e., as indicated by arrows 590 and 592) with yoke body 500 about axis 594 (e.g., provided by fastener bolt 1004 of FIG. 10) relative to central cage 114 in an amount less than or equal to about ¼ degree relative to yoke body 500 (but alternatively may be less than about ¼ degree or more than about ¼ degree in other embodiments). The allowable tilt range may be enlarged for a given application by giving up some range hinge rotation motion. Uninstalled, self-aligning roller bearing 508 may have a tilt capacity of about 10 degrees in one embodiment.

The self-aligning capacity of roller bearing 508 allows positional and angular variation (i.e., misalignment) between the surface hinge line cross-bolt axle 130 and central cage 114 which is fixed by the rigid yoke assembly 110 to the surface hinge line cross bolt axle 132. In one embodiment, this angular variation may be described as the accumulated tolerances of the elevator hinge fitting and torque tube structures. The combined cross-bolt rotational freedom and bearing self-alignment freedom of yoke assembly 108 also allows longitudinal axis of cage 114 to be moved from being parallel to CV joint assembly centerline 330. This freedom of movement allows for a rotational offset or rigging of the two surface hinge lines of respective elevator hinges 103 and 105 of elevator system 100, e.g., by deflecting input push rod assembly 112 so as to rotate cage 114 in a manner as described elsewhere herein. Although one exemplary embodiment of a semi-rigid rotational joint in the form of semi-rigid yoke assembly 108 is described above, it will be understood that any other semi-rigid rotational joint configuration may be employed that is suitable for providing rotational motion in multiple planes relative to cage 114 or other cross connection device, e.g., including lateral rotational motion relative to cage 114 or other cross connection device.

Figure 6:
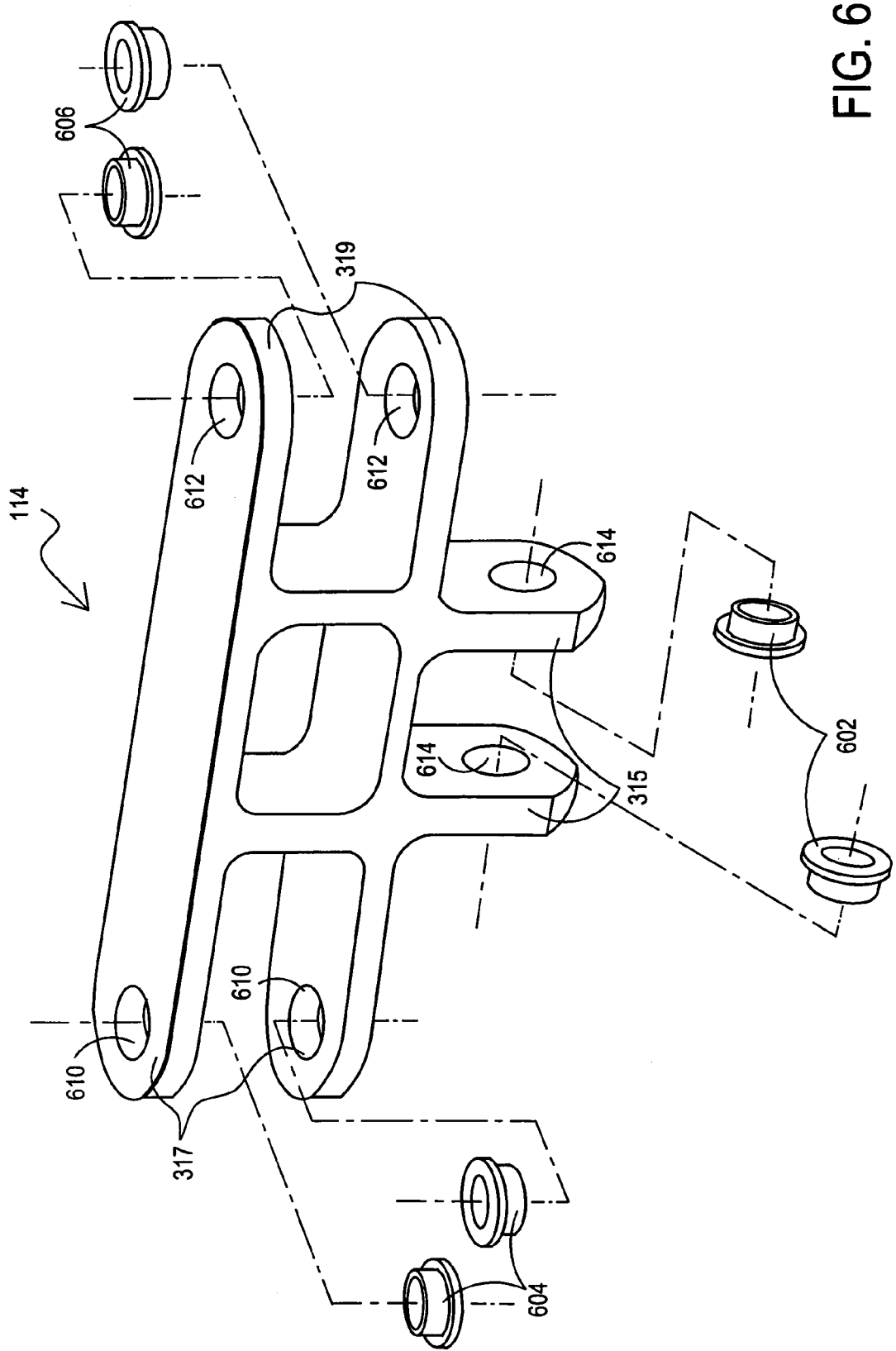
FIG. 6 is an exploded oblique view of a central cage assembly according to one exemplary embodiment of the disclosed systems and methods.

FIG. 6 shows an exploded oblique view of central cage assembly 114 that provides a rigid position control between the self-aligning bearing of semi-rigid yoke assembly 108 and the axles of rigid yoke assembly 110. As illustrated, middle input clevis 315 includes openings 614 for receiving two input clevis bushings 602 configured to form a rigid axle for coupling to aft end 182 of input push rod assembly 112 in a manner further described herein. Further, each of devises 317 and 319 include respective openings 610 and 612 for receiving clevis bushings 604 or 606 configured to form an axle for coupling to one or yoke assemblies 110 or 108. In this exemplary embodiment, input clevis 315 may be used to provide an angular control of the cage position when attached to the input push rod assembly 112. The adjustability of cage 114 is controlled by the rigid axle of the input clevis 315 being twisted and then locked out of the "nominal" position by deflecting the aft portion 182 of the control input push rod assembly 112. Twisting or moving cage 114 in directions so that the longitudinal axis of cage 114 is not parallel to the centerline 330 of CV joint assembly allows the flexibility of the modified CV joint installation to compensate for accumulated tolerances of the surface assemblies and hinge assemblies and CV joint elements without custom fitting or shimming. Although one exemplary embodiment of a cross connection in the form of central cage assembly 114 is described above, it will be understood that any other cross connection configuration may be employed that is suitable for mechanically coupling and laterally spacing two rotational joints (e.g., rigid and semi-rigid rotational joints) that have laterally-spaced axes of rotation relative to each other and, in one embodiment, for mechanical coupling to a control input device, e.g., via push rod assembly 112 or other control transmission mechanism suitable for transmitting control motion from a control input device to the cross connection.

Figure 7:
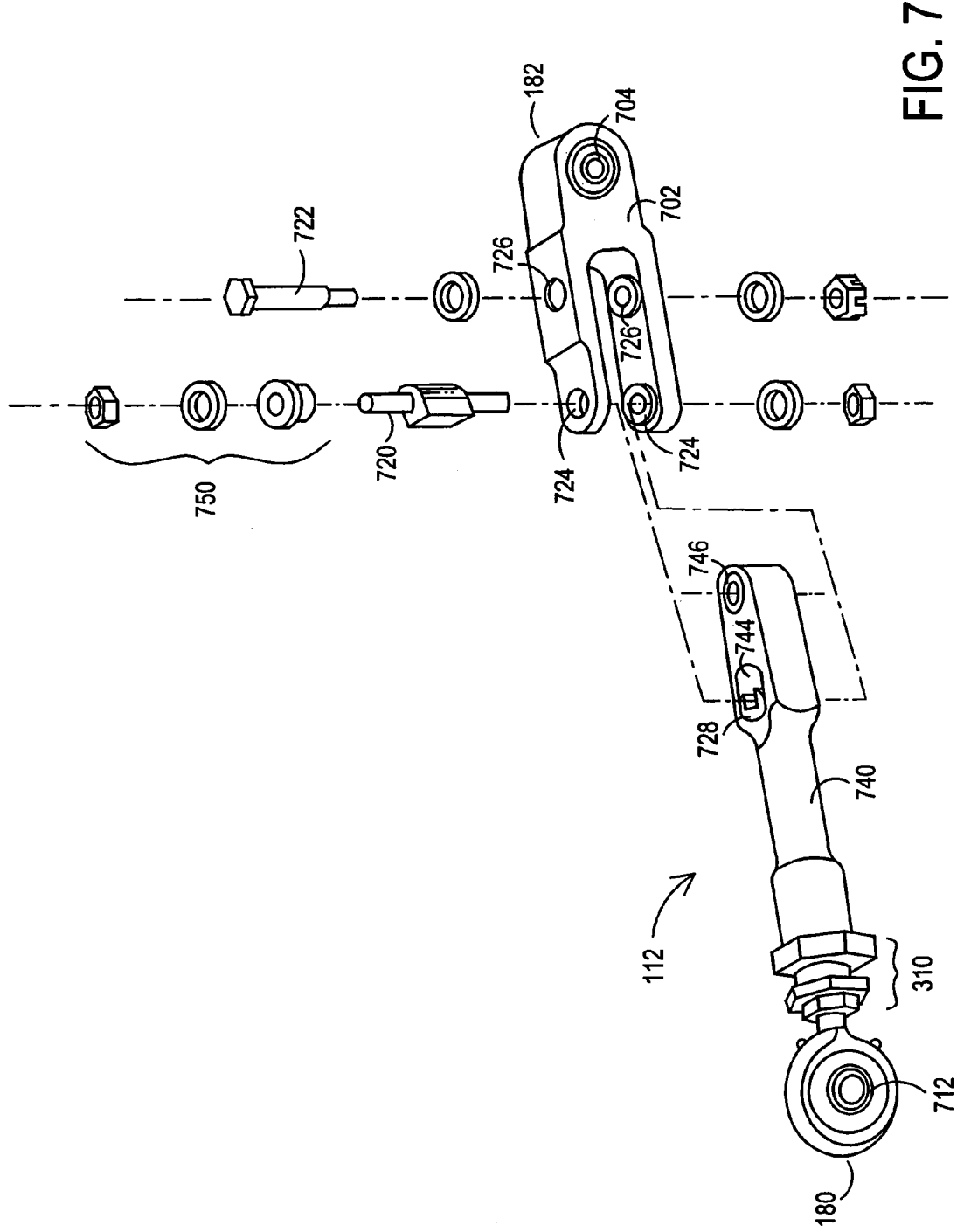
FIG. 7 is an exploded oblique view of an input push rod assembly according to one exemplary embodiment of the disclosed systems and methods.

As shown in FIG. 7, input push rod assembly 112 of this exemplary embodiment includes a forward end 180 and aft end 182, with at least two discrete adjustable features, e.g., input push rod assembly 112 may be configured to be laterally articulatable and adjustable in length. When installed in an aircraft as part of a modified CV joint linkage mechanism, input push rod assembly 112 may be employed to transmit command input motion from a control lever mounted on the vertical stabilizer (not shown) to input clevis 315 of central cage 114. The adjustability of push rod assembly 112 acts to combine the rigging and alignment elements of the modified CV joint linkage mechanism. In this regard, the ability to laterally deflect push rod assembly 112 in order to skew central cage 114 provides the modified CV joint linkage mechanism with the capability to align the elevator surface trailing edges 140 and 142 and/or to tolerate any manufacturing variation in angularity of the yoke axes on the control surface hinge line torque tubes 103 and 105. The ability to adjust the length of input push rod assembly 112 may be used to position surface trailing edges 140 and 142 during rigging operations.

Referring in more detail to FIG. 7, input push rod assembly 112 may be configured to articulate laterally in the aft portion of the assembly, although other portion/s of push rod assembly 112 may be alternatively or additionally configured to articulate laterally (the advantages of the aft lateral articulation include minimizing the angular offset and side thrust loads within the forward self-aligning roller rod end bearing 180). In FIG. 7, aft rod end 182 is shown configured with pivot member 702 that includes a doubled bearing pack forming rigid hinge axle 704 for mating with the input clevis 315 of central cage 114. Rigid hinge axle 704 is configured to be fixed and oriented parallel to the longitudinal axis of central cage 114 when installed as part of a modified CV joint linkage mechanism.

Figure 8:
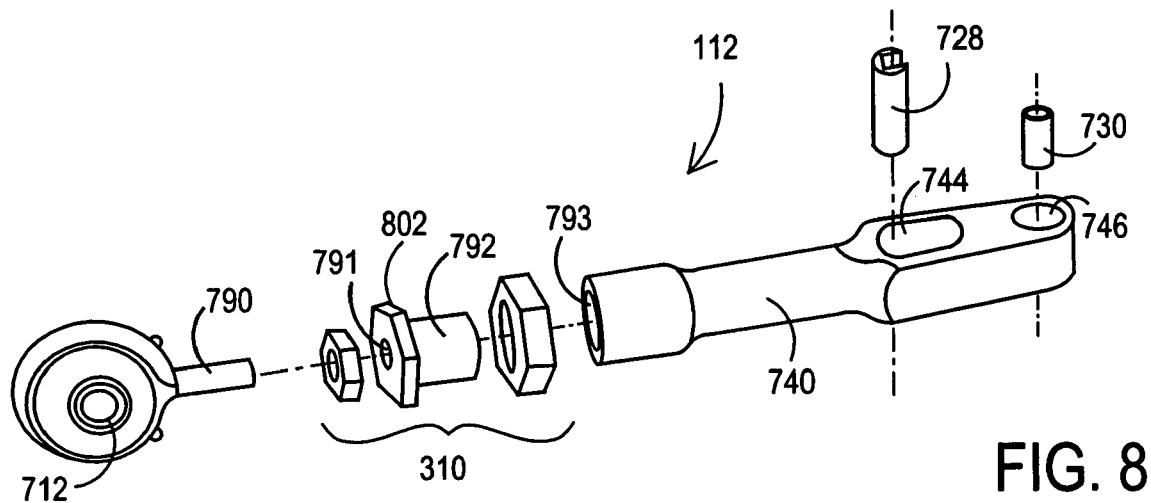
FIG. 8 is an exploded oblique view of selected forward portion components of an input push rod assembly according to one exemplary embodiment of the disclosed systems and methods.
Figure 9:
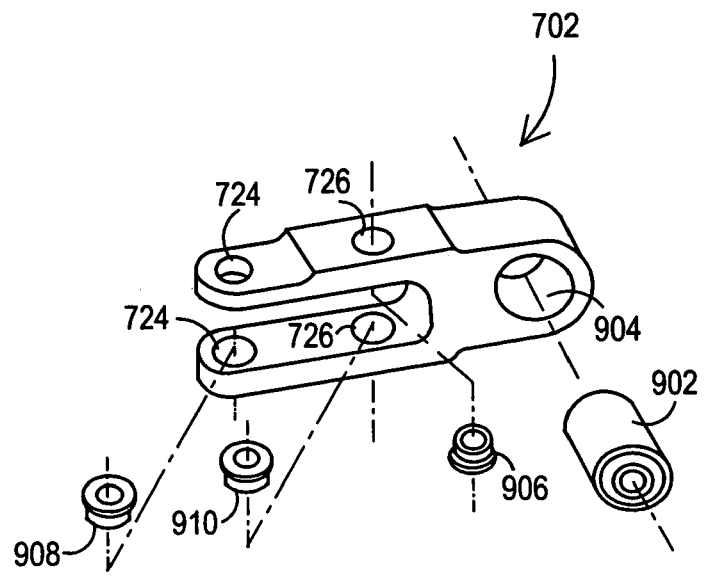
FIG. 9 is an exploded oblique view of selected aft portion components of an input push rod assembly according to one exemplary embodiment of the disclosed systems and methods.

In the illustrated embodiment of FIG. 7, aft end 182 of push rod assembly 112 also includes a push rod deflection mechanism in the form of a lockable eccentric cam assembly that may be used to deflect the rod assembly 112, e.g., for synchronizing the control surface trailing edges 140 and 142. Pivot member 702 includes aft openings 726 configured to receive rod deflection pivot bolt 722 to form a rod deflection point (e.g., rod deflection pivot point 296 of FIGS. 2A and 2B) and forward openings 724 configured to receive lockable eccentric cam drive shaft 720 that provides lateral force to laterally articulate or deflect input push rod 112 about its rod deflection point. Input push rod assembly also includes a push rod body 740 that is configured at its aft end to be pivotably coupled to pivot member 702 as shown. In this regard, aft end of rod body 740 includes an aft opening 746 configured to receive rod deflection pivot bolt 722 and a forward elongated opening 744 configured to receive a crescent shaped cam 728. Once assembled within elongated opening 744, crescent shaped cam 728 is in position to receive and mate with lockable eccentric cam drive shaft 720, and may be secured in place by a busing (not shown). FIG. 8 further illustrates elongated opening 744 and crescent shaped cam 728 that is configured to received eccentric cam drive shaft 720. When assembled together the cross sections of the eccentric cam drive shaft 720 and the crescent shaped cam 728 form a circular eccentric cam surface (or eccentrically rotatable cylinder) that is trapped within the elongated opening 744 (i.e., the centerline of drive shaft 720 is offset from the centerline of the rotatable cylinder so that the circular cam surface has an off center axis of rotation within opening 744). Also shown is circular opening 746 and cylindrical bushing 730 that receives rod deflection pivot bolt 722. FIG. 9 further illustrates pivot member 702 with hinge bearing 902 that is received in opening 904 to form rigid hinge axle 704. Also shown are lower bearings 908 and 910 that are received in lower openings 724 and 726, and upper bearing 906 that is received in upper opening 726.

When assembled as part of a modified CV joint linkage mechanism, eccentric cam drive shaft 720 may be rotated with the mated crescent shaped cam 728 in relation to elongated opening 744 to selectably deflect rod assembly 112 about its rod deflection point. In this regard, rod assembly may be bent in dogleg fashion about its rod deflection point in the desired direction by rotating eccentric cam shaft 720 with cam 728 until aft end of rod body 740 pivots about rod deflection pivot bolt 722 and rod assembly 112 is displaced or bent laterally by contact between the off-centered outer surface of cam shaft 720 and cam 728 on the inner surface of elongated opening 744 that corresponds to the desired direction and amount of displacement. Rod assembly 112 may be straightened by rotating eccentric cam shaft 720 and cam 728 so that the off-centered outer surface of cam 728 is aligned symmetrically with the inner surface of elongated opening 744, i.e., in a position such that eccentric cam 728 exerts no lateral deflection force on rod body 740. Locking mechanism components 750 are provided for locking or holding eccentric cam 720 in desired position of rotation.

It will be understood that a lockable eccentric cam assembly is just one example of an optional push rod deflection mechanism that may be provided in combination with a deflectable push rod assembly. In this regard, any other form of mechanism or methodology that is suitable for deflecting one or more portions of a deflectable push rod in order to skew the central cage of an attached CV joint assembly may be employed. For example, a two-piece deflectable push rod assembly may be provided with a set of overlapping push rod adjustment surfaces (e.g., serrated surfaces) that may be secured together in variable positions with one or more fastener/s. In such an alternative embodiment, the surfaces may be unclamped, the push rod deflected laterally, and the surfaces reclamped together to hold the push rod in deflected position. Thus, it will be understood that any one or more parts of a rod assembly may be bent or deflected in any manner (e.g., using any suitable mechanism) and geometrical configuration suitable for causing an attached central cage to skew and translate to movement of first and second adjacent controllable devices in opposite directions. In this regard, it is not necessary that a rod assembly be bent in dogleg fashion about a rod deflection point.

As further shown in FIG. 7, forward end 180 of push rod assembly 112 includes a length adjustment mechanism in the form of turnbuckle assembly 310 on forward end of push rod body 740 that engages a threaded self-aligning rod end bearing 712. The self-aligning roller rod end 712 may be configured for attachment to a clevis of an existing control lever (not shown) mounted to the vertical stabilizer of a T-tail aircraft. In such an exemplary embodiment, the turnbuckle assembly 310 and threaded self-aligning roller rod end bearing 712 may be employed in conjunction with turnbuckle assembly 310 for length adjustment to position surface trailing edges 140 and 142 during rigging. The self-aligning nature of forward end 180 of push rod assembly 112 also tolerates or acts to absorb the motion of lateral deflection adjustment of rod 112. Advantageously, self-aligning rod end 180 also tolerates or allows aeroelastic "rocking" motions between the horizontal and vertical stabilizers (not shown) through the control linkage system without adversely loading or deflecting the linkage. This is because self-aligning rod end 180 allows input push rod body 740 to be free to rotate with the elevator system and horizontal stabilizer relative to the vertical stabilizer and pitch control lever clevis (e.g., up to about 10 degrees rotation in one embodiment) without causing misalignment in the elevator trailing edge surfaces 140 and 142. Further advantageously, this self aligning ability may be implemented without the presence of additional stabilization for push rod assembly 112, e.g., without a torque knee linkage attached between the push rod assembly and the vertical stabilizer.

FIG. 8 further illustrates components of turnbuckle assembly 310 (including turnbuckle adjuster 802) and threaded self-aligning rod end bearing 712 having externally threaded rod 790 that threads into internally threaded turnbuckle barrel opening 791 defined in front end of turnbuckle adjuster 802. As shown turnbuckle adjuster 802 has externally threaded rear end 792 that is threadably received in internal threaded opening 793 defined in forward end of input push rod body 740. In the illustrated exemplary embodiment, external threads of threaded rod 790 may be rotated in relation to internal threads of turnbuckle barrel opening 791 to selectably lengthen or shorten push rod assembly 112.

It will be understood that the illustrated length adjustment mechanism components of turnbuckle assembly 310, threaded self-aligning rod end bearing 712 and input push rod body 740 are exemplary only and that any other configuration suitable for implementing length adjustment may be employed, e.g., the forward end of an input push rod body may be alternatively configured as an externally threaded rod that is received in an extended internally threaded barrel provided on the rear/aft end of a turnbuckle adjuster (i.e., rather than an externally threaded rear end 792) that is otherwise configured with an internally threaded turnbuckle barrel opening on its front end for receiving externally threaded rod 790 of a threaded self-aligning rod end bearing 712. It is also possible that a push rod assembly may be configured with length adjustment mechanism/s located in one or more portions of a push rod assembly (e.g., including portions other than the forward push rod end).

It will be understood that a turnbuckle assembly and threaded self-aligning roller rod end bearing are just examples of self-aligning and length adjustment mechanisms that may be provided as part of an input push rod assembly, and that it is not necessary that both push rod self-alignment and push rod length adjustment features be combined, or to be present at all (e.g., an input push rod may be provided with self-alignment and separate push rod length adjustment mechanisms). In this regard, any form of length adjustment mechanism and/or methodology suitable for adjusting the length of an input push rod assembly may be employed (e.g., ½ turn thread adjustments on the rod end, overlapped serrated segments in place of the turnbuckle, etc). Furthermore, it is not necessary that a length adjustment mechanism be located on the forward end of an input push rod assembly, e.g., one or more length adjustment mechanism/s may be located at any point forward of an input push rod assembly that is suitable for adjusting the length of same.

Figure 10:
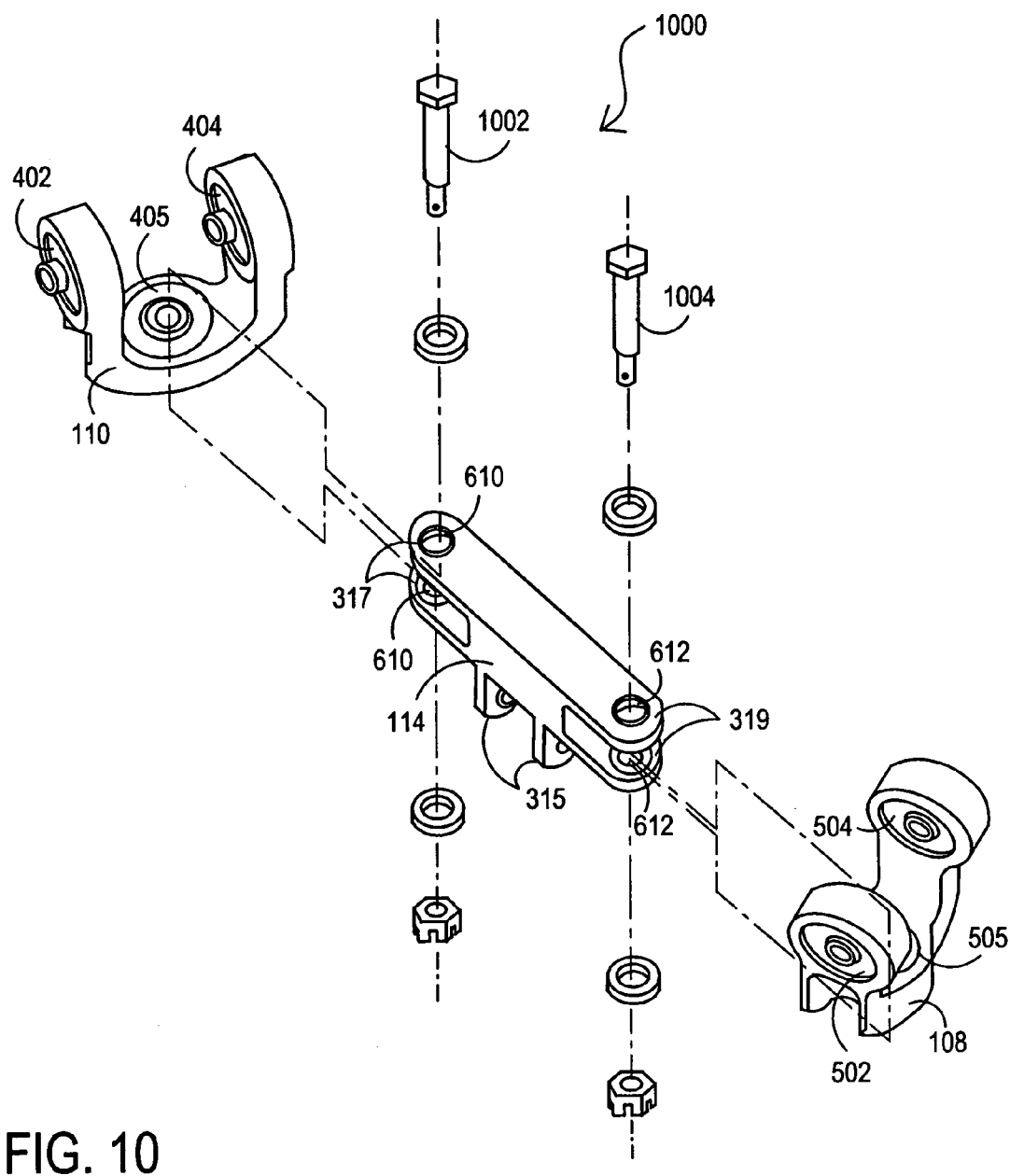
FIG. 10 is an exploded oblique view of a CV joint assembly according to one exemplary embodiment of the disclosed systems and methods.

FIG. 10 shows components of a CV joint assembly 1000 of the exemplary embodiment of dual elevator system 100 described above in relation to FIGS. 3 through 9. CV joint assembly 1000 includes control yokes 110 and 108, and cantilevered central cage 114. Yokes 110 and 108 are each planar symmetric with two rigid bearings (402 and 404, 502 and 504) for accepting respective cross-bolts 132 and 130 through respective control surface hinge line torque tube structures 103 and 105. As previously described, yokes 110 and 108 differ from each other in the type of central bearing employed. Rigid yoke 110 employs two spaced rigid hinge bearings 406 and 408 (forming a bearing pack) and acts as the anchor end connection for central cage 114. Semi-rigid yoke 108 employs a self-aligning roller bearing 508. Cantilevered cage 114 may be a rigid machining that includes two parallel axes with devises 317 and 319 provided for connection to the two yokes 110 and 108 respectively, and having a third axis normal to the first two axes with a clevis 315 provided for connection to command input push rod assembly 112.

In one embodiment, CV joint assembly 1000 may be sub-assembled by bolting the two yokes 110 and 108 to central cage 114 prior to further assembly with other components of a modified CV joint linkage mechanism. As illustrated in FIG. 10, this may be accomplished using yoke fastener bolts 1002 and 1004 that are received through openings 610 and 612 and corresponding bushings in respective devises 317 and 319, and that are received through openings 405 and 505 and corresponding bearings in respective yoke assemblies 110 and 108.

Although CV joint assembly 1000 includes a rigid yoke 110 and semi-rigid yoke 108, it will be understood that benefits of the disclosed systems and methods may be realized using a CV joint assembly configured in the same manner as CV joint assembly 1000, but including two rigid yokes rather than one rigid and one semi-rigid yoke. For example, a dual elevator system of a T-tail aircraft may be configured with a control linkage that includes a deflectable input push rod assembly that is mechanically coupled to two rigid universal joint yoke assemblies (i.e., rather than to a rigid universal joint yoke assembly and a semi-rigid universal joint yoke assembly) by a CV joint cage. Such an embodiment may be realized, for example, by substituting a rigid universal joint yoke assembly for semi-rigid universal joint yoke assembly 108 of dual elevator system 100 of FIGS. 1-3. In such an alternative embodiment, shimming may be required for installation of the control linkage.

Referring again to FIG. 3, a modified CV joint control linkage mechanism may be retrofitted to an existing T-tail aircraft as follows. CV joint assembly 1000 may be installed as part of the existing dual elevator system of the T-tail aircraft by bolting yoke uprights 420 and 422 to previously installed hinge line torque tube structure 103 that is coupled to actuate elevator surface 102, and by bolting yoke uprights 520 and 522 to previously installed hinge line torque tube structure 105 that is coupled to actuate elevator surface 104. Advantageously, self-aligning bearing 508 of semi-rigid yoke 108 may be used to compensate for manufacturing variance of the elevator assembly location, the angular variation of attachment cross-bolts 130 and 132, and the width variation of the centrally positioned hinge fitting 106. In this regard, self-aligning bearing 508 of semi-rigid yoke 108 allows yoke 108 to be tilted as required to adjust for the accumulated tolerances of each specific aircraft installation. Installation of command input push rod assembly 112 acts to restrain CV joint cage 114 by push rod attach bolt 370 that traps aft rod end bearing pack of rigid hinge axle 704 in central clevis 315 of cage 114 and laterally fixing the forward push rod end 180 in the clevis of the previously installed existing control lever of the aircraft (not shown). Central cage 114 may be moved or twisted so as to align the surface trailing edges 140 and 142 by deflecting the aft portion of input push rod assembly 112 with the push rod deflection mechanism (e.g., in the form of lockable eccentric cam assembly previously described). The forward portion of input push rod may be length-adjusted using the length adjustment mechanism (e.g., in the form of turnbuckle assembly 310) for "rigging" the control surfaces 102 and 104 with the cockpit controls to assure full range of motion.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A control linkage mechanism for producing synchronous motion in two adjacent elevator surfaces of a T-tail aircraft, comprising:
   a first universal joint yoke assembly configured for coupling to control a first one of said adjacent elevator surfaces of a T-tail aircraft that is rotatably attached to a horizontal stabilizer of a tail assembly of said aircraft;
   a second universal joint yoke assembly configured for coupling to control a second one of said adjacent elevator surfaces of a T-tail aircraft that is rotatably attached to a horizontal stabilizer of said tail assembly of said aircraft;
   a central cage coupled between said first universal joint yoke assembly and said second universal joint yoke assembly; and
   an input push rod assembly having a first end coupled to said central cage and a self aligning second end configured for coupling to a control input device;
   wherein said first universal joint yoke assembly is configured to rotate in a single plane relative to said central cage; and wherein said second universal joint yoke assembly is configured to rotate in multiple planes relative to said central cage; and
   wherein said adjacent elevator surfaces are swept elevator surfaces of a T-tail aircraft having hinge lines that are skewed relative to each other; wherein said first universal joint assembly comprises two first yoke uprights attached by a first cross bolt extending between said two first yoke uprights at a right angle to a hinge line of said first one of said adjacent elevator assemblies; and wherein said second universal joint assembly comprises two second yoke uprights attached by a second cross bolt extending between said two second yoke uprights at a right angle to a hinge line of said second one of said adjacent elevator assemblies.

2. The control linkage mechanism of claim 1, further comprising a push rod deflection mechanism configured to laterally deflect said input push rod assembly.

3. The control linkage mechanism of claim 2, wherein said push rod deflection mechanism comprises a lockable eccentric cam assembly, said lockable eccentric cam assembly being configured to deflect said input push rod assembly laterally about a rod deflection pivot point.

4. The control linkage mechanism of claim 1, wherein said self aligning second end comprises a self-aligning rod end bearing.

5. The control linkage mechanism of claim 1, wherein said first universal joint assembly comprises two first yoke uprights with a first yoke axle disposed therebetween and a first hinge axle oriented at a right angle to said first yoke axle; wherein said second universal joint yoke assembly comprises two second yoke uprights with a second yoke axle disposed therebetween and a second hinge axle oriented at a right angle to said second yoke axle; wherein said central cage is coupled between said first hinge axle of said first universal joint yoke assembly and said second hinge axle of said second universal joint yoke assembly; and wherein said first universal joint yoke assembly is configured to rotate about said first hinge axle in a single plane relative to said central cage; and wherein said second universal joint yoke assembly is configured to rotate about said second hinge axle in multiple planes relative to said central cage.

6. A dual elevator system for an aircraft having a vertical stabilizer and a horizontal stabilizer attached to said vertical stabilizer, said dual elevator system comprising:
   a first elevator assembly, said first elevator assembly having a first elevator surface and a first elevator hinge, said first elevator hinge being rotatably attached to said horizontal stabilizer of said aircraft;
   a second elevator assembly, said second elevator assembly having a second elevator surface and a second elevator hinge, said second elevator hinge being rotatably attached to said horizontal stabilizer of said aircraft; and
   a modified constant velocity joint control linkage mechanism that comprises:
      a first universal joint yoke assembly having a yoke axle coupled to said first elevator hinge,
      a second universal yoke assembly having a yoke axle coupled to said second elevator hinge,
      a central cage coupled between said first universal joint yoke assembly and said second universal joint yoke assembly, and
      an input push rod assembly having a first end coupled to said central cage and a self-aligning second end coupled to a control lever, said control lever being fixedly attached to said vertical stabilizer of said aircraft.

7. The dual elevator system of claim 6, wherein said aircraft is a T-tail aircraft; and wherein said horizontal stabilizer is supported by said vertical stabilizer.

8. The dual elevator system of claim 7, further comprising a push rod deflection mechanism configured to laterally deflect said input push rod assembly to impart a rotational offset between a hinge line of said first elevator hinge and a hinge line of said second elevator hinge; and wherein said self-aligning second end of said input push rod assembly is configured to absorb deflection of said input push rod assembly.

9. The dual elevator system of claim 8, wherein said push rod deflection mechanism comprises a lockable eccentric cam assembly, said lockable eccentric cam assembly being configured to deflect said input push rod assembly laterally about a rod deflection pivot point.

10. The dual elevator system of claim 6, wherein no stabilizing linkage is attached between said input push rod assembly and said vertical stabilizer.

11. The dual elevator system of claim 6, wherein said self-aligning second end of said input push rod assembly is configured to allow aeroelastic rocking motion between said horizontal stabilizer and said vertical stabilizer through said modified constant velocity joint control linkage mechanism.

12. The dual elevator system of claim 6, wherein said first universal joint yoke assembly is configured to rotate in a single plane relative to said central cage; and wherein said second universal joint yoke assembly is configured to rotate in multiple planes relative to said central cage.

13. The method of claim 6, wherein said first and second elevator assemblies are swept elevator assemblies having hinges that are skewed relative to each other; wherein said yoke axle of said first universal joint yoke assembly is coupled at a right angle to said first elevator hinge; and wherein said yoke axle of said second universal joint yoke assembly is coupled at a right angle to said second elevator hinge.

14. A method for inducing synchronous motion of two adjacent controllable devices, comprising:
  providing a first rotational joint comprising two first yoke uprights with a first yoke axle disposed therebetween and a first hinge axle oriented at a right angle to said first yoke axle, said first yoke axle being coupled at a right angle to a first one of said controllable devices;
  providing a second rotational joint comprising two second yoke uprights with a second yoke axle disposed therebetween and a second hinge axle oriented at a right angle to said second yoke axle, said second yoke axle being coupled at a right angle to a second one of said controllable devices;
  providing a cross-connection coupled between said first and second hinge axles of said first and second rotational joints, said cross connection comprising a third hinge axle between said first and second hinge axles and being adjustable to produce differential motion between said first and second controllable devices;
  providing a self-aligning input push rod assembly having a first end coupled to said cross connection at said third hinge axle between said first and second hinge axles, and a second end configured for coupling to receive a single input control motion; and
  inducing said synchronous motion in said first and second controllable devices in response to said single input control motion received at said third hinge axle of said cross connection;
  wherein said synchronous motion is induced by providing control motion to said first controllable device through said first rotational joint, and providing control motion to said second controllable device to said second controllable device through said second rotational joint; and
  wherein said two adjacent controllable devices comprise dual elevator surfaces of a T-tail aircraft.

15. The method of claim 14, wherein said first and second rotational joints each comprise a universal joint yoke assembly.

16. The method of claim 15, wherein said first rotational joint comprises a rigid universal joint yoke assembly; and wherein said second rotational joint comprises a semi-rigid universal joint assembly.

17. The method of claim 14, wherein said input push rod assembly comprises a push rod deflection mechanism configured to laterally deflect said input push rod assembly.

18. A method of installing a modified constant velocity joint control linkage mechanism in an existing dual elevator system of an aircraft having a vertical stabilizer and a horizontal stabilizer attached to said vertical stabilizer, said method comprising:

providing an aircraft having an existing dual elevator system and original control system for same, said existing dual elevator system having a vertical stabilizer and a horizontal stabilizer attached to said vertical stabilizer; and
  retrofitting said aircraft by replacing one or more components of said original control system with said modified constant velocity joint control linkage mechanism in the following manner:
  providing said modified constant velocity joint control linkage mechanism that comprises:
    a first universal joint yoke assembly,
    a second universal yoke assembly,
    a central cage coupled between said first universal joint yoke assembly and said second universal joint yoke assembly, and
    an input push rod assembly having a first end coupled to said central cage and a self-aligning second end;
  attaching said first universal joint yoke assembly to a first elevator hinge of a first elevator assembly of said elevator system, said first elevator hinge being rotatably attached to said horizontal stabilizer of said aircraft;
  attaching said second universal yoke assembly to a second elevator hinge of a second elevator assembly of said elevator system, said second elevator hinge being rotatably attached to said horizontal stabilizer of said aircraft; and
    attaching said self-aligning second end of said input push rod to a control lever of said elevator assembly;
    wherein said first universal joint yoke assembly is configured to rotate in a single plane relative to said central cage; and wherein said second universal joint yoke assembly is configured to rotate in multiple planes relative to said central cage.

19. The method of claim 18, wherein said input push rod assembly further includes a length adjustment mechanism; and wherein said method further comprises using said length adjustment mechanism to adjust the length of said input push rod assembly so as to adjust the position of respective elevator surfaces of said first and second elevator assemblies relative to a position of said control lever.

20. The method of claim 19, wherein said input push rod assembly further includes a push rod deflection mechanism; and wherein said method further comprises using said push rod deflection mechanism to laterally deflect said input push rod assembly so as to adjust position of respective elevator surfaces of said first and second elevator assemblies relative to each other.

21. The method of claim 18, wherein said original control system comprises elevator control horns, an input control link and a torque knee; and wherein said method comprises replacing said elevator control horns, input control link and torque knee with said modified constant velocity joint control linkage mechanism.

22. The method of claim 18, wherein said first and second elevator assemblies are swept elevator assemblies having hinges that are skewed relative to each other; wherein each of said first and second yoke assemblies comprises a yoke axle; and wherein said method further comprises attaching said yoke axle of said first universal joint yoke assembly at a right angle to said first elevator hinge, and attaching said yoke axle of said second universal joint yoke assembly at a right angle to said second elevator hinge.

23. A method for inducing synchronous motion of two adjacent controllable devices, comprising:

providing a first rotational joint comprising two first yoke uprights with a first yoke axle disposed therebetween and a first hinge axle oriented at a right angle to said first yoke axle, said first yoke axle being coupled at a right angle to a first one of said controllable devices;

providing a second rotational joint comprising two second yoke uprights with a second yoke axle disposed therebetween and a second hinge axle oriented at a right angle to said second yoke axle, said second yoke axle being coupled at a right angle to a second one of said controllable devices;

providing a cross-connection coupled between said first and second hinge axles of said first and second rotational joints, said cross connection comprising a third hinge axle between said first and second hinge axles and being adjustable to produce differential motion between said first and second controllable devices;

providing a self-aligning input push rod assembly having a first end coupled to said cross connection at said third hinge axle between said first and second hinge axles, and a second end configured for coupling to receive a single input control motion; and inducing said synchronous motion in said first and second controllable devices in response to said single input control motion received at said third hinge axle of said cross connection;

wherein said synchronous motion is induced by providing control motion to said first controllable device through said first rotational joint, and providing control motion to said second controllable device to said second controllable device through said second rotational joint; and wherein said first yoke axle is coupled at a right angle to a hinge line of said first one of said controllable devices; wherein said second yoke axle is coupled at a right angle to a hinge line of said second one of said controllable devices; and wherein said hinge line of said first one of said controllable devices is skewed relative to said hinge line of said second one of said controllable devices.

24. The method of claim 23, wherein said first and second rotational joints each comprise a universal joint yoke assembly.

25. The method of claim 24, wherein said first rotational joint comprises a rigid universal joint yoke assembly; and wherein said second rotational joint comprises a semi-rigid universal joint assembly.

26. The method of claim 23, wherein said two adjacent controllable devices comprise dual elevator surfaces of a T-tail aircraft.

27. The method of claim 23, wherein said input push rod assembly comprises a push rod deflection mechanism configured to laterally deflect said input push rod assembly.

* * * * *

UNITED STATES PATENT AND TRADEMARK OFFICE
CERTIFICATE OF CORRECTION

PATENT NO. : 7,331,548 B1  Page 1 of 1
APPLICATION NO. : 11/003788
DATED : February 19, 2008
INVENTOR(S) : Michael Simkulet It is certified that error appears in the above-identified patent and that said Letters Patent is hereby corrected as shown below:

In claim 13, column 17, line 8, delete "The method of claim 6," and insert --The dual elevator system of claim 6,--.

Signed and Sealed this

Third Day of June, 2008

JON W. DUDAS
*Director of the United States Patent and Trademark Office*